March 17, 1925.
H. W. TURNER
WEATHER SHIELD OF MOTOR VEHICLES
Filed Oct. 22, 1923
1,529,969
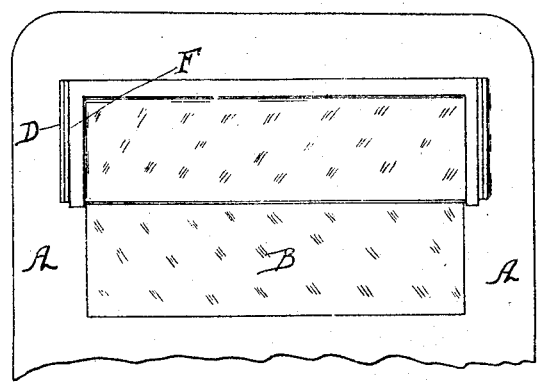
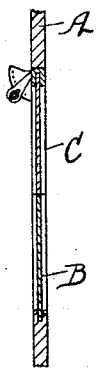
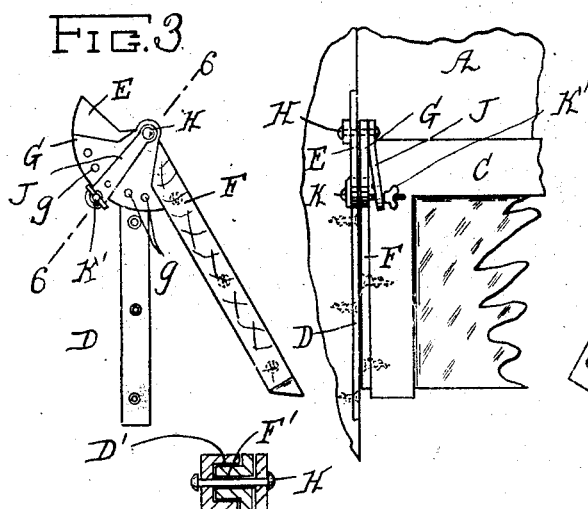
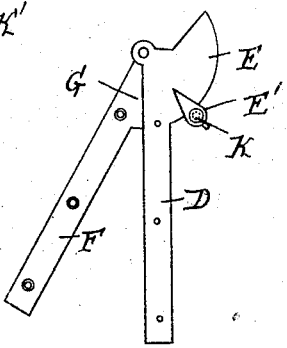
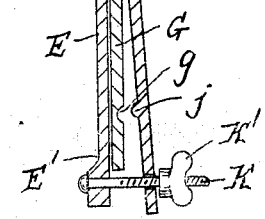
Inventor:
Herbert William Turner Patented Mar. 17, 1925.

1,529,969

UNITED STATES PATENT OFFICE.

HERBERT WILLIAM TURNER, OF AUCKLAND, NEW ZEALAND.

WEATHER SHIELD OF MOTOR VEHICLES.

Application filed October 22, 1923. Serial No. 669,919.

*To all whom it may concern:*

Be it known that I, HERBERT WILLIAM TURNER, subject of the King of Great Britain, residing at 165 New North Road, Auckland, in the Dominion of New Zealand, have invented new and useful Improvements in the Weather Shields of Motor Vehicles, of which the following is a specification.

My invention relates to that well known class of weather shields used on motor vehicles, and more particularly vehicles of the lorry type, in which a wooden or like framing is provided with a framed glass panel fitted therein and made capable of opening more or less by being hinged to open forwards at its bottom edge. Such framed panel generally combines with a fixed glass pane arranged in the main framing beneath it, so that its surface is capable of being disposed in the same plane therewith, when the hinged panel is closed, and when opened by being swung forwardly, provides a ventilating opening between their edges, while acting still as a rain shield, in the manner well known.

The invention has been devised with the object of providing improved means whereby the said panel frame may be mounted in the main framing so that it may swing both in and out and may be firmly locked at any point within the range of hinging movement provided for.

These means are illustrated in the accompanying drawings in which—

Figure 1 is a general front elevation of the whole screen showing the panel fitted therein.

Figure 2 is a cross sectional elevation of the same.

Figure 3 is an enlarged inner face elevation of the means used for mounting each end of the panel in the main framing.

Figure 4 is an outer face view thereof.

Figure 5 is an inside elevation of one end of the panel, on the same scale as in Figs. 3 and 4.

Figure 6 is a still further enlarged sectional view of the locking parts of the mounting means, the section being taken on the line 6—6 of Figure 3.

A represents the ordinary form of main framing having an opening therein, in the lower part of which the fixed glass panel B is arranged. C is the hinged panel made in the general manner by a wooden frame extending up both ends and along the top of the glass pane, and which panel is fitted into the opening in the main frame so that it covers the upper portion thereof.

The means devised for mounting the panel C in the frame A and which form the subject of this invention are duplicated at both ends of the panel. At each end, they comprise a flat metal strip D that is secured along the inside edge of the top portion of the opening in such frame, by means of screws passing through screw holes in the strip formed for that purpose. The top end of this strip is shaped with a segmental extension E that projects rearwards from the back of the frame A. Combined with this strip is a second strip F of similar design that is secured along the adjacent edge of the panel frame and which strip is also formed with a segmental plate extension G projecting rearwards. These extensions lie face to face and are fastened together by means of the pivot pin H extending through them at their centres.

The pivot pins H at both ends therefore provide the hinges upon which the panel may swing in or out. They are so disposed that the panel, when swung in, will form a uniform plane with the main frame and the fixed glass panel B, as shown in Figures 1 and 2.

The segmental plate G, as the panel C is moved, slides over the plate E, and means are provided whereby the two may be locked together at any desired degree of opening of the panel, or when the panel is closed, so that the panel will be held firmly in the desired position.

Suitable locking means are shown in Figures 3, 5 and 6. They consist in a spring arm J that is fixed to radiate from the central pivot H across the face of the plate G and to extend beyond the edge thereof. This arm has a normal spring away from the surface of this plate. Its end is then connected to the fixed plate E by means of a bolt K passing through a boss E' on such plate edge and loosely through the said arm. A thumb nut K' is screwed on to the end of the bolt to engage the arm so that by screwing in the nut, the arm may be pressed in against its spring and made to engage the face of the plate G. The arm J on its inside, is formed with a small knob *j* and the surface of the plate G is formed with a number of depressions *g* arranged at intervals apart in a line concentric to the pivot and coincident with the position of the knob *j*.

The knob *j* is therefore adapted to be forced in to engage with any one of these depressions *g* by the operation of the thumb nut, and thereby to lock the plate G to the plate E and thus prevent any movement of the panel. When the nut K' is unscrewed, the arm J will spring back thereby freeing the plate G so that the panel may be turned in the required manner, the plate moving freely over the face of the plate E and within the arm J.

Other designs of locking means may be employed if so desired, as the formation and the relative arrangement of the plates E and G lend themselves to a number of different appliances adapted to this purpose.

If desired, and in order to provide a wide bearing surface for the hinge joint between the two strips D and F, the said joint may be formed as shown in Figure 6, by constructing the strip D with a circular recess D' into which a boss F' on the adjacent face of the strip F fits, the pivot pin H then passing through both.

I claim:—

In wind shield mounting means, the combination with the main frame, and the hinged panel frame, of a flat metal strip secured along the inner edge of the frame opening and formed with a segmental enlargement, a similar metal strip secured to extend along the hinged panel on its adjacent side edge and likewise formed with a segmental enlargement face to face with the said other segmental enlargement, a pivot pin extending transversely through the centers of both said enlargements, and locking means for the said enlargements comprising a spring arm extending radially from the said pivot pin across the segmental enlargement secured to the frame opening, the said spring arm normally sprung away from said enlargement, a bolt passing transversely through the edge of said enlargement and through the end of the said spring arm, a thumb nut screwed on the outer end of said bolt to engage the said arm, the latter being formed with a knob on its inner face adapted to enter depressions formed concentrically upon the adjacent face of the enlargement secured to the said hinged panel.

In testimony whereof, I affix my signature.

HERBERT WILLIAM TURNER.

Witnesses:
 DAVID BROWN HULTON,
 I. W. McCOY.